(12) United States Patent
Kimura

(10) Patent No.: US 7,883,642 B2
(45) Date of Patent: *Feb. 8, 2011

(54) ANTIOXIDANT COMPOSITION EXCELLENT IN ANTI-BLOCKING PROPERTY

(75) Inventor: Kenji Kimura, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 291 days.

This patent is subject to a terminal disclaimer.

(21) Appl. No.: 11/600,153

(22) Filed: Nov. 16, 2006

(65) Prior Publication Data

US 2007/0108417 A1 May 17, 2007

(30) Foreign Application Priority Data

Nov. 16, 2005 (JP) ............................. 2005-331256

(51) Int. Cl.
*C09K 15/32* (2006.01)
*C09K 15/00* (2006.01)
*C07F 9/6574* (2006.01)

(52) U.S. Cl. .............................. 252/400.24; 252/400.2; 252/397; 524/117; 558/85; 558/95

(58) Field of Classification Search ................ 524/117; 558/885, 95; 252/400.2, 397, 400.24, 404
See application file for complete search history.

(56) References Cited

U.S. PATENT DOCUMENTS

| | | | | | |
|---|---|---|---|---|---|
| 4,196,117 | A | * | 4/1980 | Spivack | 524/119 |
| 4,244,746 | A | * | 1/1981 | Washecheck et al. | 106/268 |
| 4,248,747 | A | * | 2/1981 | Washecheck et al. | 524/275 |
| 4,348,495 | A | * | 9/1982 | Buysch et al. | 524/117 |
| 4,351,759 | A | * | 9/1982 | Spivack | 524/100 |
| 5,482,987 | A | * | 1/1996 | Forschirm | 524/230 |
| 5,889,095 | A | | 3/1999 | Inui et al. | |
| 5,891,939 | A | * | 4/1999 | Kikuchi et al. | 524/117 |
| 6,075,159 | A | * | 6/2000 | Inui et al. | 558/170 |
| 6,800,228 | B1 | * | 10/2004 | Semen | 264/109 |
| 7,635,732 | B2 | * | 12/2009 | Kimura et al. | 524/117 |
| 7,683,112 | B2 | * | 3/2010 | Kimura et al. | 524/117 |
| 2007/0149422 | A1 | * | 6/2007 | Miyajima et al. | 508/451 |
| 2008/0177005 | A1 | * | 7/2008 | Kimura et al. | 525/340 |
| 2008/0262124 | A1 | * | 10/2008 | Kimura et al. | 523/351 |

FOREIGN PATENT DOCUMENTS

| | | |
|---|---|---|
| EP | 0 400 454 | 12/1990 |
| EP | 0 823 435 | 2/1998 |
| JP | 49080147 A * | 8/1974 |
| WO | 2006/090485 | 8/2006 |

OTHER PUBLICATIONS

Derwent abstracts JP 49080147 A to Mitsubishi Chem Ind Ltd.*

* cited by examiner

*Primary Examiner*—Mark Eashoo
*Assistant Examiner*—Jane L Stanley
(74) *Attorney, Agent, or Firm*—Wenderoth, Lind & Ponack, L.L.P.

(57) ABSTRACT

An antioxidant composition containing an antioxidant represented by the following formula (I) and a metal salt of fatty acid of a carbon number of 4 to 18, wherein a weight ratio of the antioxidant (I) and the metal salt of fatty acid is in a range of (100:0.1) to (100:200).

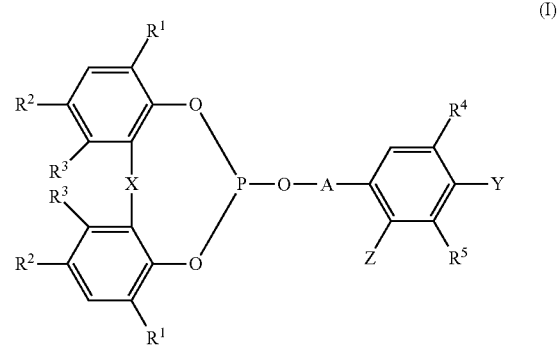

14 Claims, No Drawings

ANTIOXIDANT COMPOSITION EXCELLENT IN ANTI-BLOCKING PROPERTY

TECHNICAL FIELD

The present invention relates to an antioxidant composition.

BACKGROUND ART

An antioxidant is used as a stabilizer when a thermoplastic resin such as polyolefin and the like is processed. However, since after production of a thermoplastic resin, an antioxidant is generally used by adding thereto, there is a problem that it causes blocking at storage in a storehouse or the like.

DISCLOSURE OF THE INVENTION

An object of the present invention is to provide an antioxidant composition having improved anti-blocking property at storage.

In order to find out an antioxidant composition having improved anti-blocking property at storage, the present inventors studied and, as a result, found out that an antioxidant composition containing a certain antioxidant and a metal salt of fatty acid of a carbon number of 4 to 18 is excellent in anti-blocking property.

That is, the present invention provides the following [1] to [11]:

[1] An antioxidant composition containing an antioxidant represented by the following formula (I) and a metal salt of fatty acid of a carbon number of 4 to 18, wherein a weight ratio of the antioxidant (I) and the metal salt of fatty acid is in a range of (100:0.1) to (100:200).

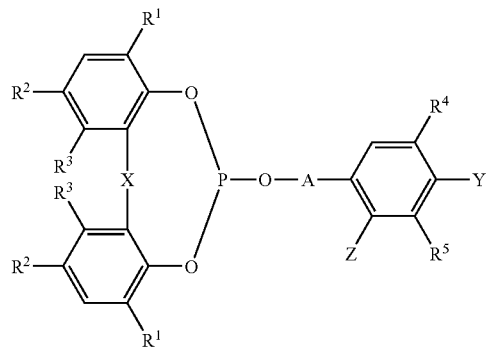

(I)

[wherein $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group, $R^3$ represents a hydrogen atom or an alkyl group of a carbon number of 1 to 8, X represents a single bond, a sulfur atom or a —$CHR^6$— group, wherein $R^6$ represents a hydrogen atom, an alkyl group of a carbon number of 1 to 8 or a cycloalkyl group of a carbon number of 5 to 8, A represents an alkylene group of a carbon number of 2 to 8, or a *—$COR^7$ group, wherein $R^7$ represents a single bond or an alkylene group of a carbon number of 1 to 8, and a symbol * represents that this place and an oxygen atom in a >P—O— group in the formula (I) are bound, Y and Z are such that any one of them represents a hydroxyl group, an alkoxy group of a carbon number of 1 to 8, or an aralkyloxy group of a carbon number of 7 to 12, and the other of them represents a hydrogen atom or an alkyl group of a carbon number of 1 to 8, provided that when Y is a hydroxyl group, any one of $R^4$ and $R^5$ represents an alkyl group of a carbon number of 3 to 8, a cycloalkyl group of a carbon number of 5 to 8, an alkylcycloalkyl group of a carbon number of 6 to 12, an aralkyl group of a carbon number of 7 to 12, or a phenyl group, and two $R^1$s in the formula (I) may be the same or different, two $R^2$s in the formula (I) may be the same or different, and two $R^3$s in the formula (I) may be the same or different]

[2] The antioxidant composition according to [1], wherein a maximum of an integrating force measured when stored under the wet heating condition of 50° C. and a relative humility of 80% for 10 days or longer is less than 20 (N/cm²).

[3] The antioxidant composition according to [1] or [2], wherein the metal salt of fatty acid of a carbon number of 4 to 18 is at least one kind selected from the group consisting of a calcium salt, a magnesium salt and a zinc salt.

[4] The antioxidant composition according to any one of [1] to [3], wherein the metal salt of fatty acid of a carbon number of 4 to 18 is calcium stearate.

[5] The antioxidant composition according to any one of [1] to [4], wherein a weight ratio of the antioxidant represented by the formula (I) and the metal salt of fatty acid of a carbon number of 4 to 18 is in a range of (100:2) to (100:100).

[6] A method of improving anti-blocking property of an antioxidant composition, comprising blending 0.1 to 200 parts by weight of a metal salt of fatty acid of a carbon number of 4 to 18 based on 100 parts by weight of an antioxidant represented by the following formula (I).

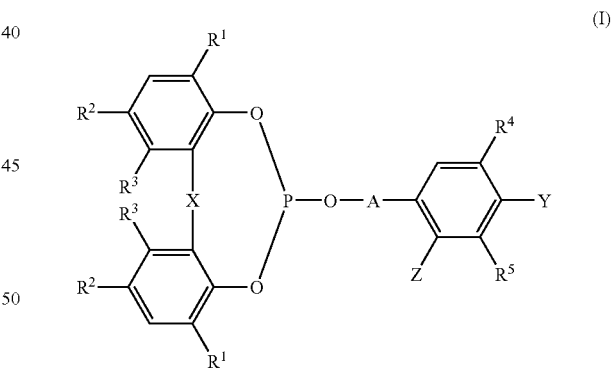

(I)

[wherein $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group, $R^3$ represents a hydrogen atom or an alkyl group of a carbon number of 1 to 8, X represents a single bond, a sulfur atom or a —$CHR^6$— group, wherein $R^6$ represents a hydrogen atom, an alkyl group of a carbon number of 1 to 8 or a cycloalkyl group of a carbon number of 5 to 8, A represents an alkylene group of a carbon number of 2 to 8, or a *—$COR^7$ group, wherein $R^7$ represents a single bond or an alkylene group of a carbon number of 1 to 8, and a symbol * represents that this place and an oxygen atom in a >P—O— group in the formula (I) are bound, Y and Z are such that any one of them represents a hydroxyl group, an alkoxy group of a carbon number of 1 to 8, or an aralkyloxy group of a carbon number of 7 to 12, and the other of them represents a hydrogen atom or an alkyl group of a carbon number of 1 to 8, provided that when Y is a hydroxyl group, any one of $R^4$ and $R^5$ represents an alkyl group of a carbon number of 3 to 8, a cycloalkyl group of a carbon number of 5 to 8, an alkylcycloalkyl group of a carbon number of 6 to 12, an aralkyl group of a carbon number of 7 to 12, or a phenyl group, and two $R^1$s in the formula (I) may be the same or different, two $R^2$s in the formula (I) may be the same or different, and two $R^3$s in the formula (I) may be the same or different]

[7] The improving method according to [6], wherein the metal salt of fatty acid of a carbon number of 4 to 18 is at least one kind selected from the group consisting of a calcium salt, a magnesium salt, and a zinc salt.

[8] The improving method according to [6] or [7], wherein the metal salt of fatty acid of a carbon number of 4 to 18 is calcium stearate.

[9] A process for producing an antioxidant composition, comprising a step of blending 0.1 to 200 parts by weight of a metal salt of fatty acid of a carbon number of 4 to 18 based on 100 parts by weight of an antioxidant represented by the following formula (I).

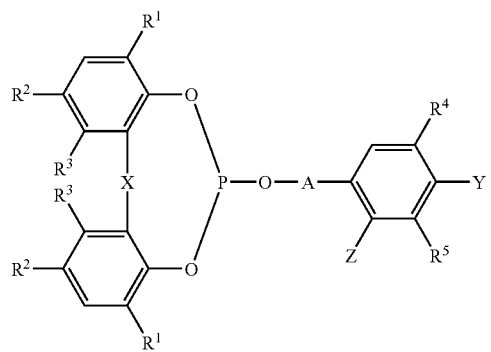

(I)

[wherein $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group, $R^3$ represents a hydrogen atom or an alkyl group of a carbon number of 1 to 8, X represents a single bond, a sulfur atom or a —$CHR^6$— group, wherein $R^6$ represents a hydrogen atom, an alkyl group of a carbon number of 1 to 8 or cycloalkyl group of a carbon number of 5 to 8, A represents an alkylene group of a carbon number of 2 to 8, or a *—$COR^7$— group, wherein $R^7$ represents a single bond or an alkylene group of a carbon number of 1 to 8, a symbol * represents that this place and an oxygen atom in a >P—O— group in the formula (I) are bound, Y and Z are such that any one of them represents a hydroxyl group, an alkoxy group of a carbon number of 1 to 8, or an aralkyloxy group of a carbon number of 7 to 12, and the other of them represents a hydrogen atom or an alkyl group of a carbon number of 1 to 8, provided that when Y is a hydroxyl group, any one of $R^4$ and $R^5$ represents an alkyl group of a carbon number of 3 to 8, a cycloalkyl group of a carbon number of 5 to 8, an alkylcycloalkyl group of a carbon number of 6 to 12, an aralkyl group of a carbon number of 7 to 12, or a phenyl group, and two $R^1$s in the formula (I) may be the same or different, two $R^2$s in the formula (I) may be the same or different, and two $R^3$s in the formula (I) may be the same or different]

[10] The process according to [9], wherein the metal salt of fatty acid of a carbon number of 4 to 18 is at least one kind selected from the group consisting of a calcium salt, a magnesium salt and a zinc salt.

[11] The process according to [9] or [10], wherein the metal salt of fatty acid of a carbon number of 4 to 18 is calcium stearate.

MODE FOR CARRYING OUT THE INVENTION

The present invention will be explained in detail below.

In an antioxidant represented by the formula (I) (hereinafter, referred to as phosphorus-based antioxidant (I) in some cases), $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group.

Herein, examples of the alkyl group of a carbon number of 1 to 8 include a methyl group, a t-butyl group, a t-pentyl group, and a t-octyl group.

Examples of the cycloalkyl group of a carbon number of 5 to 8 include a cyclopentyl group, a cyclohexyl group, a cycloheptyl group, and a cyclooctyl group.

Examples of the alkylcycloalkyl group of a carbon number of 6 to 12 include a 1-methylcyclopentyl group, a 1-methylcyclohexyl group, and a 1-methyl-4-i-propylcyclohexyl group.

Examples of the aralkyl group of a carbon number of 7 to 12 include a benzyl group, an α-benzyl group, and an α,α-dimethylbenzyl group.

In the phosphorus-based antioxidant (I), $R^3$ represents a hydrogen atom or an alkyl group of a carbon number of 1 to 8. Examples of the alkyl group of a carbon number of 1 to 8 include the same groups as those described above. As $R^3$, a hydrogen atom or a methyl group is preferable.

In the phosphorus-based antioxidant (I), X represents a single bond, a sulfur atom or a —$CHR^6$— group, wherein $R^6$ represents a hydrogen atom, an alkyl group of a carbon number of 1 to 8 or a cycloalkyl group of a carbon number of 5 to 8. Examples of the alkyl group of a carbon number of 1 to 8 and the cycloalkyl group of a carbon number of 5 to 8 include same the groups as those described above.

As X, a single bond, a methylene group or an ethylidene group is preferable.

In the phosphorus-based antioxidant (I), A represents an alkylene group of a carbon number of 2 to 8, or a *—$COR^7$— group, wherein $R^7$ represents a single bond or an alkylene group of a carbon number of 1 to 8, and a symbol * represents that this place and an oxygen atom in a >P—O—group in the formula (I) are bound. Examples of the alkylene group of a carbon number of 1 to 8 include an ethylene group, a propylene group, a butylene group, a pentamethylene group, a hexamethylene group, an octamethylene group, and a 2,2- dimethyl-1,3-propylene group. As A, an alkylene group of a carbon number of 2 to 4 or the aforementioned *—$COR^7$— group is preferable.

The alkylene group of a carbon number of 2 to 4 may be such that a carbon-carbon bond thereof is interrupted with a group containing a hetero atom. Examples of the group containing a hetero atom in this case include a —OCO— group and a —COO— group. As $R^7$, an alkylene group of a carbon number of 1 to 4 is preferable.

Y and Z are such that any one of them represents a hydroxyl group, an alkoxy group of a carbon number of 1 to 8 or an aralkyloxy group of a carbon number of 7 to 12, and the other of them represents a hydrogen atom or an alkyl group of a carbon number of 1 to 8, provided that when Y is a hydroxyl group, any one of $R^4$ and $R^5$ is preferably an alkyl group of a carbon number of 3 to 8, a cycloalkyl group of a carbon number of 5 to 8, an alkylcycloalkyl group of a carbon number of 6 to 12, an aralkyl group of a carbon number of 7 to 12 or a phenyl group. Examples of the alkoxy group of a carbon number of 1 to 8 include alkoxy groups in which an alkyl part is the same as the alkyl group of a carbon number of 1 to 8, and examples of the aralkyloxy group of a carbon number of 7 to 12 include aralkyloxy groups in which an aralkyl part is the same as the aralkyl group of a carbon number of 7 to 12.

When Y in the formula (I) is a hydroxyl group, it is more preferable that Z is a hydrogen atom or a methyl group, and it is more preferable that one of $R^4$ and $R^5$ is a t-butyl group.

In addition, when Z in the formula (I) is a hydroxyl group, it is preferable that $R^5$ is a methyl group, Y is a hydrogen atom, and $R^4$ is a t-butyl group.

In addition, $R^1$, $R^2$ and $R^3$ in the formula (I) may be the same or different.

As the phosphorus-based antioxidant (I), the following exemplified compounds are particularly preferable: 6-[3-(3-t-butyl-4-hydroxy-5-methylphenyl)propoxy]-2,4,8,10-tetra-t-butyldibenz[d,f][1,3,2]dioxaphosphepine [hereinafter, referred to as A1 in some cases], 6-[3-(3,5-di-t-butyl-4-hydroxyphenyl)propoxy]-2,4,8,10-tetra-t-butyldibenz[d,f][1,3,2]dioxaphosphepine, 6-[3-(3,5-di-t-butyl-4-hydroxyphenyl)propoxy]-4,8-di-t-butyl-2,10-dimethyl-12H-dibenzo[d,g][1,3,2]dioxaphosphosine, and 6-[3-(3,5-di-t-butyl-4-hydroxyphenyl)propionyloxy]-4,8-di-t-butyl-2,10-dimethyl-12H-dibenzo[d,g][1,3,2]dioxaphosphosine.

As the metal salt of fatty acid of a carbon number of 4 to 18 used in the present invention, a monovalent to trivalent metal salt of fatty acid of a carbon number of 10 to 18 is preferable. As the fatty acid in the metal salt of fatty acid, stearic acid is preferable.

Examples of the metal salt of fatty acid include a calcium salt, a magnesium salt, a zinc salt, an aluminum salt, and a mixture thereof. A calcium salt, a magnesium salt, a zinc salt, a trivalent aluminum salt, and a mixture thereof are preferable, a calcium salt, a magnesium salt, a zinc salt, and a mixture thereof are more preferable and, as a zinc salt, a divalent zinc salt is preferable.

Examples of a preferable metal salt of fatty acid include calcium stearate (hereinafter, referred to as B1 in some cases), aluminum stearate, zinc stearate, and magnesium stearate. Calcium stearate is particularly preferable.

The antioxidant composition of the present invention is produced by blending the antioxidant (I) and the metal salt of fatty acid of a carbon number of 4 to 18 into a uniform composition.

A blending ratio of the phosphorus-based antioxidant (I) and the metal salt of fatty acid of a carbon number of 4 to 18 is such that a metal salt of fatty acid of a carbon number of 4 to 18 is usually in a range of 0.1 to 200 parts by weight, preferably in a range of 2 to 100 parts by weight, particularly preferably in a range of 5 to 60 parts by weight based on 100 parts by weight of the phosphorus-based antioxidant (I).

In the present invention, an antioxidant other than the antioxidant (I) and/or a light stabilizer may be contained. In this case, an amount of the metal salt of fatty acid of a carbon number of 4 to 18 to be blended is usually in a range of 0.1 to 200 parts by weight, preferably in a range of 2 to 100 parts by weight, particularly preferable in a range of 5 to 60 parts by weight based on a total 100 parts by weight of an antioxidant other than the antioxidant (I) and/or a light stabilizer.

A concentration of the antioxidant (I) in the antioxidant composition of the present invention is preferably a high concentration from an economical point of view, and is more preferably not less than 30% by weight, more preferably not less that 50% by weight, particularly preferably not less than 60% by weight.

Examples of an antioxidant other than the antioxidant (I) include the following compounds:

2,6-di-t-butyl-4-methylphenol, n-octadecyl 3-(3,5-di-t-butyl-4-hydroxyphenyl)propionate, pentaerythrityl tetrakis(3-(3,5-di-t-butyl-4-hydroxyphenyl)propionate), triethyleneglycol bis(3-(3-t-butyl-5-methyl-4-hydroxyphenyl) propionate), 1,3,5-trimethyl-2,4,6-tris(3,5-di-t-butyl-4-hydroxybenzyl)benzene, tris(3,5-di-t-butyl-4-hydroxybenzyl)isocyanurate, 3,9-bis(2-(3-(3-t-butyl-4-hydroxy-5-methylphenyl)propionyloxy)-1,1-dimethylethyl)-2,4,8,10-tetraoxaspiro[5•5]undecane, 2,2'-methylenebis(6-t-butyl-4-methylphenol), 4,4'-butylidenebis(6-t-butyl-3-methylphenol), 4,4'-thiobis(6-t-butyl-3-methylphenol), 2-t-butyl-6-(3-t-butyl-2-hydroxy-5-methylbenzyl)-4-methylphenyl acrylate, 2-(1-(2-hydroxy-3,5-t-amylphenyl)ethyl)-4,6-di-t-amylphenyl acrylate), dialkyl (C12-18) 3,3'-thiodipropionate, pentaerythrityl tetrakis(3-laurylthiopropionate), and tris(2,4-di-t-butylphenyl) phosphite.

Examples of the light stabilizer include the following compounds:

2-hydroxy-4-n-octoxybenzophenone, 2-(2-hydroxy-5-methylphenyl)benzotriazole, 2-(3-t-butyl-2-hydroxy-5-methylphenyl)-5-chlorobenzotriazole, 2,4-di-t-butylphenyl 3,5-di-t-butyl-4-hydroxybenzoate, bis(2,2,6,6-tetramethyl-4-piperidyl)sebacate, dimethyl succinate•1-(2-hydroxyethyl)-4-hydroxy-2,2,6,6-tetramethylpiperidine polycondensate, poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}].

In the antioxidant composition in the present invention, when an antioxidant other than the antioxidant (I) is contained, it is preferable that a total concentration of an antioxidant (I), and an antioxidant other than the antioxidant (I) and/or a light stabilizer in the antioxidant composition is not less than 50%, and it is particularly preferable that a total concentration of an antioxidant (I), and an antioxidant other than the antioxidant (I) and/or a light stabilizer is not less than 60%.

A method of mixing a metal salt of fatty acid of a carbon number of 4 to 18 and an antioxidant (I) is not particularly limited as far as it is a method of uniformly mixing both of them. Examples include a method of charging a metal salt of fatty acid of a carbon number of 4 to 18 and an antioxidant (I) into a mixing machine such as a Henschel mixer, and stirring and mixing this at a high speed, a method of mixing a metal salt of fatty acid of a carbon number of 4 to 18 into a heated and melted antioxidant (I), and cooling the mixture under stirring, and a method of adding an inert organic solvent to a mixture of a metal salt of fatty acid of a carbon number of 4 to 18 and an antioxidant (I) to wet the mixture and removing a solvent from the resulting wet mixture to dry it. Among those methods, a method of charging a metal salt of fatty acid of a carbon number of 4 to 18 and an antioxidant (I) into a mixing machine such as a Henschel mixer, and stirring and mixing this at a high speed is simple from a viewpoint of operation, and is particularly preferable also from a viewpoint of anti-blocking property of the resulting antioxidant composition.

Other additive may be blended into the antioxidant composition of the present invention. An amount of other additive to be blended is not particularly limited as far as it is in such a range that physical property of the antioxidant composition is not adversely effected.

Examples of other additive which can be blended include the following compounds:

Lubricant such as paraffin, low-molecular polyethylene wax (molecular weight; not higher than 10000), low-molecular polypropylene wax (molecular weight; not higher than 10000), stearic acid, butyl stearate, hardened castor oil, and stearyl alcohol.

Cationic antistatic agent such as primary amine salt, tertiary amino salt, quaternary amino salt and pyridine derivative.

Anionic antistatic agent such as sulfated oil, soap, sulfated ester oil, sulfate amide oil, sulfated ester salt of olefin, fatty alcohol sulfate ester salt, alkyl sulfate ester salt, fatty acid ethylsulfonate salt, alkylnaphthalenesulfonate salt, alkylbenzenesulfonate salt, succinate ester sulfonate salt and phosphate ester salt.

Nonionic antistatic agent such as partial fatty acid ester of polyhydric alcohol, ethylene oxide adduct of fatty alcohol, ethylene oxide adduct of fatty acid, ethylene oxide adduct of aliphatic amine or aliphatic acid amide, ethylene oxide adduct of alkylphenol, ethylene oxide adduct of partial fatty acid ester of polyhydric alcohol, and polyethylene glycol.

Amphoteric antistatic agent such as carboxylic acid derivative and imidazoline derivative.

Anti-fogging agent such as stearic acid monoglyceride, oleic acid monoglyceride, polyglycerin oleic acid ester, sorbitan monolaurate, and sorbitan monostearate.

Among those additives, a polyethylene wax having a molecular weight of not higher than 10000, and a polypropylene wax having a molecular weight of not higher than 10000 are preferable from a viewpoint of dispersity. These waxes are preferably added in a range of 0.1 to 10 parts by weight based on 100 parts by weight of an antioxidant (I).

In the present invention, when an antioxidant other than the antioxidant (I) and/or a light stabilizer is contained, an addition amount of the wax is preferably in a range of 0.1 to 10 parts by weight based on a total 100 parts by weight of an antioxidant (I) and an antioxidant other than the antioxidant (I) and/or a light stabilizer.

According to the present invention, it becomes possible to provide an antioxidant composition excellent in anti-blocking property at storage.

EXAMPLES

The present invention will be explained in more detail below based on Examples, but it is needless to say that the present invention is not limited by these Examples.

Examples 1 to 4, and Comparative Examples 1 to 2

A total 25 g of 6-[3-(3-t-butyl-4-hydroxy-5-methylphenyl) propoxy]-2,4,8,10-tetra-t-butyldibenz[d,f][1,3,2]dioxaphosphepine (A1) and calcium stearate (B1) were mixed using a mortar at a weight ratio described in a second column of the following Table 1, to prepare an antioxidant composition. The antioxidant composition was placed into a wide-mouthed polyethylene bottle of a volume of 100 ml, and stored at 50° C. for days described in the following Table 1 under the condition of a relative humidity of 80%. After completion of storage, using a digital force gauge [manufactured by NIDEC-SHIMPO CORPORATION] with a pushing adapter attached to a measuring axis, a force when the gauge was pushed into the antioxidant composition by 1 cm from right above to right below was measured. The force was measured in duplicate, and a maximum (N/cm$^2$) of the measured value was described. When a maximum was not less than 20 N/cm$^2$, it was determined that blocking occurred and, when a maximum was less than 20 N/cm$^2$, it was determined that blocking did not occur.

TABLE 1

| Example No. | Composition of antioxidant | Initial | 3 days | 10 days | 14 days | 21 days |
|---|---|---|---|---|---|---|
| Example 1 | A1/B1 (99/1) | 3.8 | 13 | 13 | >20 | >20 |
| Comparative Example 1 | A1/triiso-propanolamine (99/1) | 2.6 | 13 | >20 | >20 | >20 |
| Comparative Example 2 | A1 (100) | 7.3 | >20 | >20 | >20 | >20 |
| Example 2 | A1/B1 (90/10) | 0.6 | 5.3 | 12 | 17 | >20 |
| Example 3 | A1/B1 (80/20) | 0.1 | 0.5 | 3.8 | 6.8 | 16 |
| Example 4 | A1/B1 (50/50) | 0.1 | 0.3 | 0.6 | 1.1 | 2.2 |

INDUSTRIAL APPLICABILITY

Since the antioxidant composition of the present invention is excellent in anti-blocking property, the antioxidant composition is easily blended into various plastics, and a plastic with the antioxidant blended therein is processed into a product such as a film, a molded article and a pipe, and this can be suitably used.

What is claimed is:

1. An antioxidant composition consisting essentially of an antioxidant represented by the following formula (I) and a metal salt of fatty acid of a carbon number of 4 to 18, a polyethylene wax having a molecular weight of not higher than 10000, wherein the weight ratio of the antioxidant and the metal salt of fatty acid is in a range of 100:2 to 100:100, and wherein the concentration of the antioxidant represented by the formula (I) is not less than 50% by weight based on the antioxidant composition

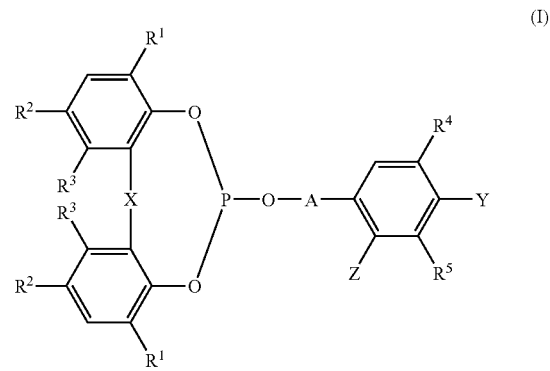

(I)

wherein $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group; $R^3$ represents a hydrogen atom or an alkyl group of a carbon number of 1 to 8;

X represents a single bond, a sulfur atom or a —CHR$^6$— group, where $R^6$ represents a hydrogen atom, an alkyl group of a carbon number of 1 to 8 or a cycloalkyl group of a carbon number of 5 to 8;

A represents an alkylene group of a carbon number of 2 to 8, or a *—COR$^7$ group, wherein $R^7$ represents a single bond or an alkylene group of a carbon number of 1 to 8, and the symbol * represents that this position and an oxygen atom in the >P—O— group in the formula (I) are bound;

one of Y and Z represents a hydroxyl group, an alkoxy group of a carbon number of 1 to 8, or an aralkyloxy group of a carbon number of 7 to 12, and the other of Y and Z represents a hydrogen atom or an alkyl group of a carbon number of 1 to 8;

provided that when Y is a hydroxyl group, any one of $R^4$ and $R^5$ represents an alkyl group of a carbon number of 3 to 8, a cycloalkyl group of a carbon number of 5 to 8, an alkylcycloalkyl group of a carbon number of 6 to 12, an aralkyl group of a carbon number of 7 to 12, or a phenyl group, and the $R^1$ in the formula (I) may be the same or different, the $R^2$ in the formula (I) may be the same or different, and the $R^3$ in the formula (I) may be the same or different.

2. The antioxidant composition according to claim 1, wherein the metal salt of fatty acid of a carbon number of 4 to 18 is at least one compound selected from the group consisting of a calcium salt, a magnesium salt and a zinc salt.

3. The antioxidant composition according to claim 1, wherein the metal salt of fatty acid of a carbon number of 4 to 18 is calcium stearate.

4. The antioxidant composition according to claim 1, wherein the composition further contains at least one additive selected from the group consisting of lubricants, antistatic agents and anti-fogging agents.

5. The antioxidant composition according to claim 1, wherein a weight ratio of the antioxidant represented by the formula (I) and the metal salt of fatty acid of a carbon number of 4 to 18 is in a range of 90:10 to 50:50.

6. The antioxidant composition according to claim 1, wherein a weight ratio of the antioxidant represented by the formula (I) and the metal salt of fatty acid of a carbon number of 4 to 18 is in a range of 80:20 to 50:50.

7. The antioxidant composition according to claim 2, wherein a weight ratio of the antioxidant represented by the formula (I) and the metal salt of fatty acid of a carbon number of 4 to 18 is in a range of 80:20 to 50:50.

8. The antioxidant composition according to claim 3, wherein a weight ratio of the antioxidant represented by the formula (I) and the metal salt of fatty acid of a carbon number of 4 to 18 is in a range of 80:20 to 50:50.

9. A method of improving the anti-blocking property of an antioxidant composition, comprising blending a polyethylene wax having a molecular weight of not higher than 10000, 2 to 100 parts by weight of a metal salt of fatty acid of a carbon number of 4 to 18 based on 100 parts by weight of an antioxidant represented by the following formula (I), wherein the concentration of the antioxidant represented by formula (I) is not less than 50% by weight based on the antioxidant composition

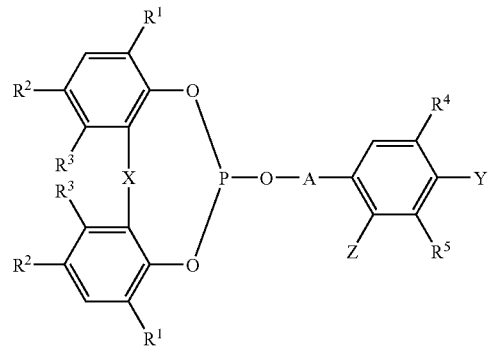

wherein $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group; $R^3$ represents a hydrogen atom or an alkyl group of a carbon number of 1 to 8;

X represents a single bond, a sulfur atom or a —CHR$^6$— group, wherein $R^6$ represents a hydrogen atom, an alkyl group of a carbon number of 1 to 8 or a cycloalkyl group of a carbon number of 5 to 8;

A represents an alkylene group of a carbon number of 2 to 8, or a *—COR$^7$ group, wherein $R^7$ represents a single bond or an alkylene group of a carbon number of 1 to 8, and the symbol * represents that this position and an oxygen atom in the >P—O— group in the formula (I) are bound;

one of Y and Z represents a hydroxyl group, an alkoxy group of a carbon number of 1 to 8, or an aralkyloxy group of a carbon number of 7 to 12, and the other of Y and Z represents a hydrogen atom or an alkyl group of a carbon number of 1 to 8;

provided that when Y is a hydroxyl group, any one of $R^4$ and $R^5$ represents an alkyl group of a carbon number of 3 to 8, a cycloalkyl group of a carbon number of 5 to 8, an alkylcycloalkyl group of a carbon number of 6 to 12, an aralkyl group of a carbon number of 7 to 12, or a phenyl group, and the $R^1$ in the formula (I) may be the same or different, the $R^2$ in the formula (I) may be the same or different, and the $R^3$ in the formula (I) may be the same or different.

10. The method according to claim 9, wherein the metal salt of fatty acid of a carbon number of 4 to 18 is at least one compound selected from the group consisting of a calcium salt, a magnesium salt, and a zinc salt.

11. The method according to claim 9, wherein the metal salt of fatty acid of a carbon number of 4 to 18 is calcium stearate.

12. A process for producing an antioxidant composition, comprising a step of blending a polyethylene wax having a molecular weight of not higher than 10000, 2 to 100 parts by weight of a metal salt of fatty acid of a carbon number of 4 to 18 based on 100 parts by weight of an antioxidant represented by the following formula (I), wherein the concentration of the antioxidant represented by formula (I) is not less than 50% by weight based on the antioxidant composition

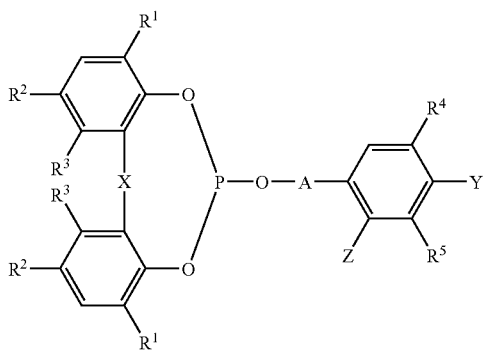
(I)

wherein $R^1$, $R^2$, $R^4$ and $R^5$ each represent independently a hydrogen atom, an alkyl group of a carbon number of 1 to 8, a cycloalkyl group of a carbon number of 5 to 8, an alkylcycloalkyl group of a carbon number of 6 to 12, an aralkyl group of a carbon number of 7 to 12, or a phenyl group; $R^3$ represents a hydrogen atom or an alkyl group of a carbon number of 1 to 8;

X represents a single bond, a sulfur atom or a —$CHR^6$— group, wherein $R^6$ represents a hydrogen atom, an alkyl group of a carbon number of 1 to 8 or a cycloalkyl group of a carbon number of 5 to 8;

A represents an alkylene group of a carbon number of 2 to 8, or a *—$COR^7$ group, wherein $R^7$ represents a single bond or an alkylene group of a carbon number of 1 to 8, and the symbol * represents that this position and an oxygen atom in the >P—O— group in the formula (I) are bound;

one of Y and Z represents a hydroxyl group, an alkoxy group of a carbon number of 1 to 8, or an aralkyloxy group of a carbon number of 7 to 12, and the other of Y and Z represents a hydrogen atom or an alkyl group of a carbon number of 1 to 8;

provided that when Y is a hydroxyl group, any one of $R^4$ and $R^5$ represents an alkyl group of a carbon number of 3 to 8, a cycloalkyl group of a carbon number of 5 to 8, an alkylcycloalkyl group of a carbon number of 6 to 12, an aralkyl group of a carbon number of 7 to 12, or a phenyl group, and the $R^1$ in the formula (I) may be the same or different, the $R^2$ in the formula (I) may be the same or different, and the $R^3$ in the formula (I) may be the same or different.

13. The process according to claim 12, wherein the metal salt of fatty acid of a carbon number of 4 to 18 is at least one compound selected from the group consisting of a calcium salt, a magnesium salt and a zinc salt.

14. The process according to claim 12, wherein the metal salt of fatty acid of a carbon number of 4 to 18 is calcium stearate.

* * * * *